P. H. PAMPEL.
CORN CUTTER.
APPLICATION FILED JAN. 7, 1919.
1,332,916.
Patented Mar. 9, 1920.
3 SHEETS—SHEET 1.
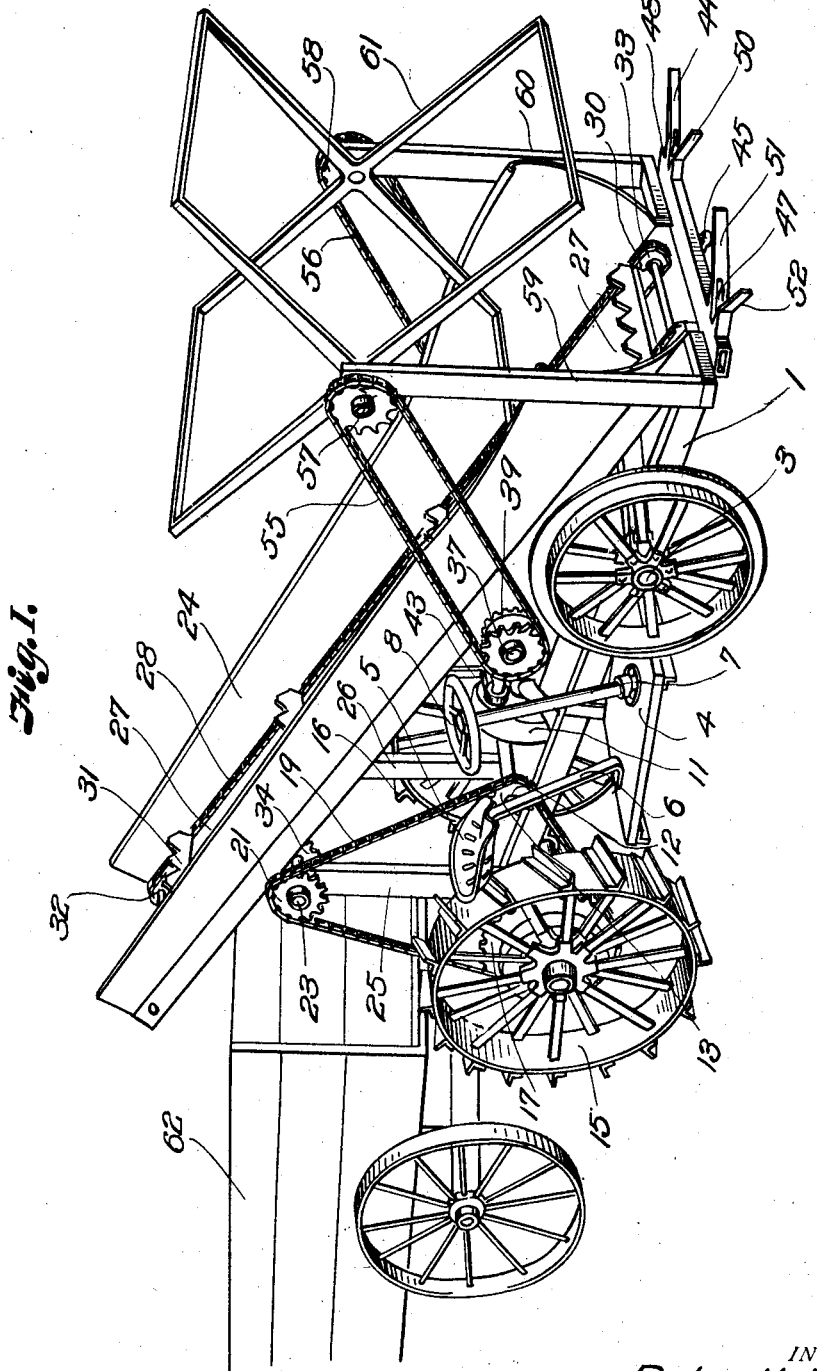
INVENTOR
Peter H. Pampel
BY
ATTORNEY

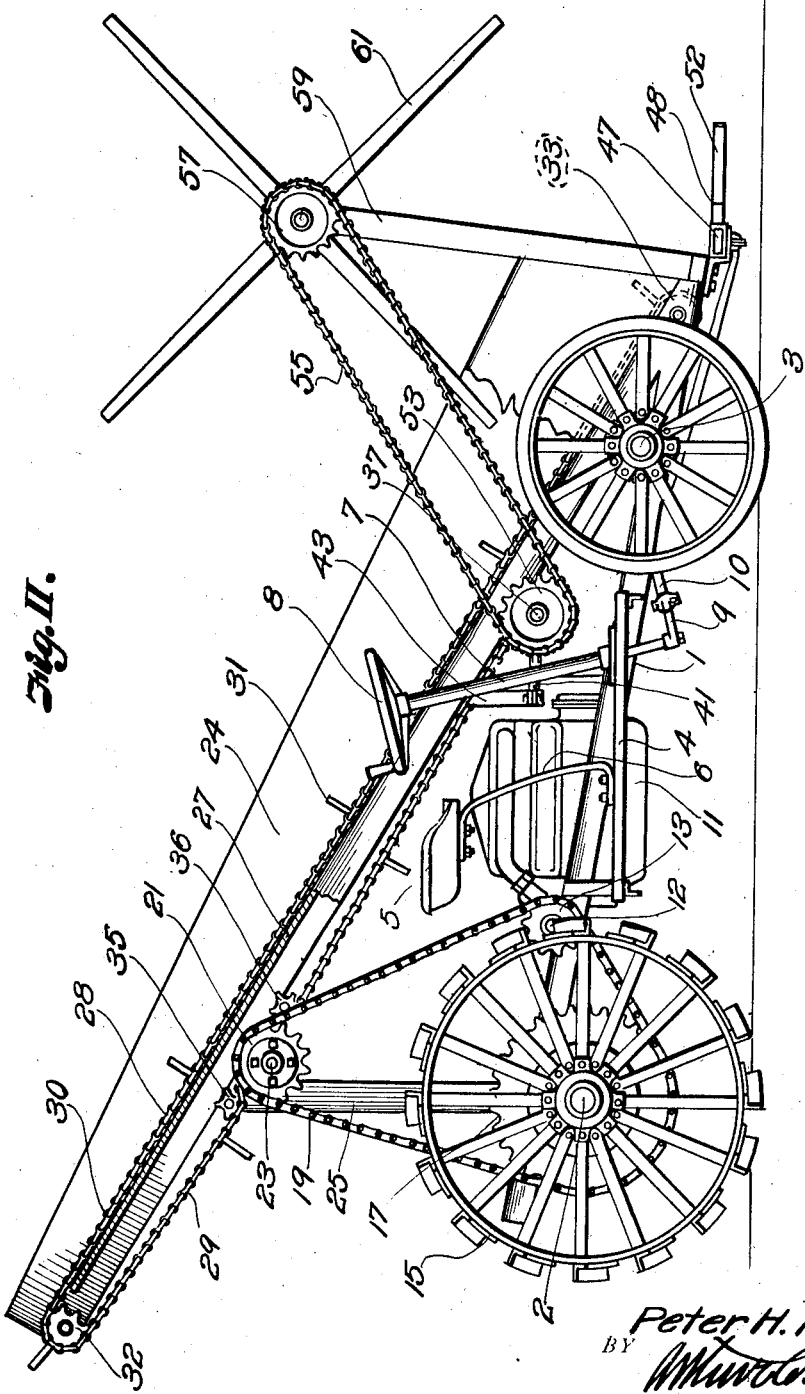

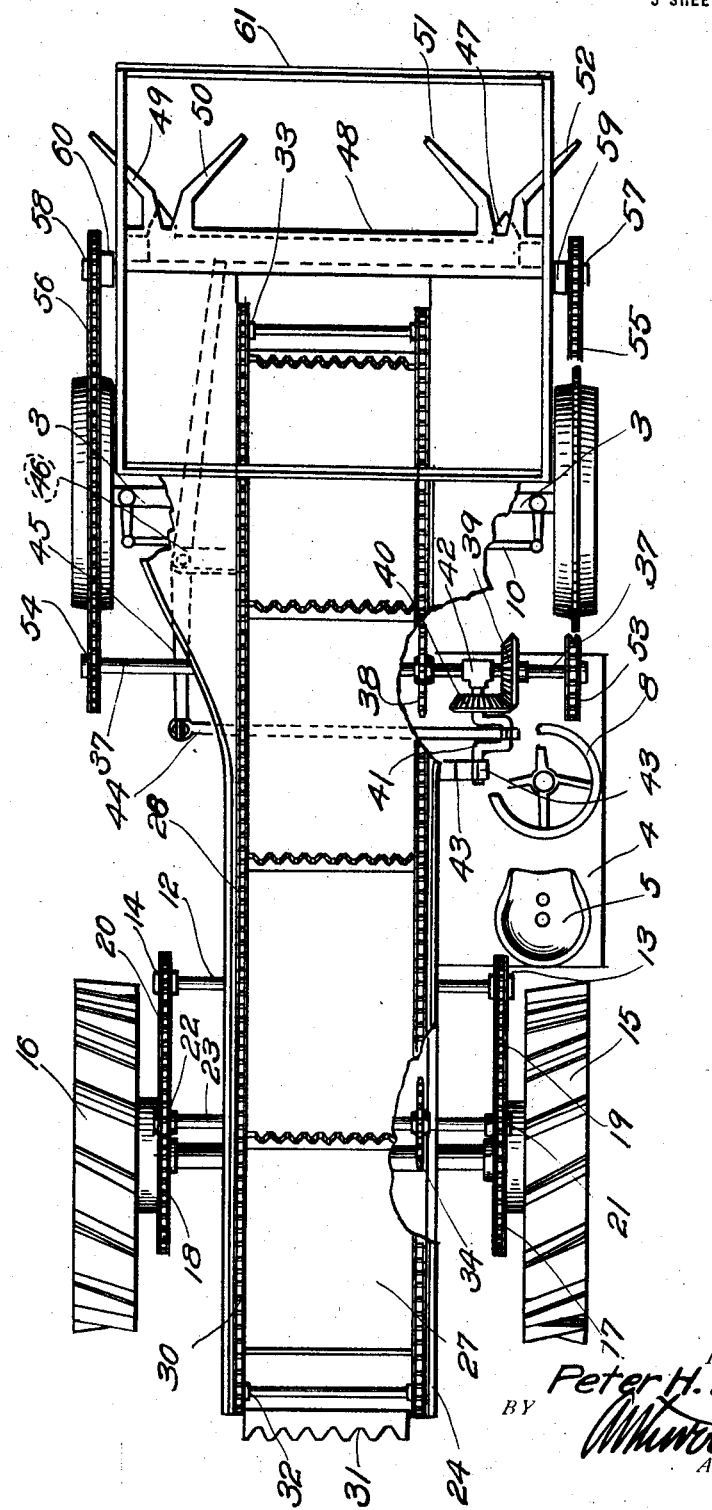

UNITED STATES PATENT OFFICE.

PETER H. PAMPEL, OF GALENA, MISSOURI.

CORN-CUTTER.

1,332,916.      Specification of Letters Patent.      Patented Mar. 9, 1920.

Application filed January 7, 1919. Serial No. 270,003.

*To all whom it may concern:*

Be it known that I, PETER H. PAMPEL, a citizen of the United States, residing at Galena, in the county of Stone and State of Missouri, have invented certain new and useful Improvements in Corn-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to corn cutters and particularly to a machine for cutting corn stalks to be used for ensilage.

One of the objects of the invention is to provide a simple, durable and efficient tractor-driven mechanism adapted to harvest the corn and convey it to the rear of the machine to be discharged into a trailer comprising any suitable vehicle adapted to receive it.

Another object of the invention is to simplify the construction of the propelling means as well as to provide a novel conveyer and operating mechanism therefor.

Other objects and advantages of the invention will be referred to hereinafter, it being understood that changes in form, proportion and minor details of construction may be resorted to without departing from the spirit of the invention or sacrificing any of its advantages.

In the drawings,

Figure I is a perspective view of a machine constructed in accordance with my invention.

Fig. II is a view partly in side elevation and partly in section of a machine constructed in accordance with my invention, and Fig. III is a plan view, parts of which are broken away.

Referring now to the drawings by numerals of reference:

1 designates a reach bar forming part of the frame and to which are connected the rear and front axles 2 and 3 respectively. Carried by the frame is a platform 4 which supports a seat 5 on the standard 6 adjacent to the steering post 7 provided with the steering wheel 8 in the usual manner. The steering post 7 is provided with a crank 9 connected to the steering rod 10 which may be of approximate construction and conveniently attached to the axle 3. The frame also supports a motor 11 which may consist of an ordinary gas engine adapted to drive a shaft 12 journaled in the frame and carrying sprockets 13 and 14 which are the driving elements of the device. On the ends of the axle 2 are tractor wheels 15 and 16 provided with drive sprockets 17 and 18 with which the chain belts 19 and 20 are engaged. These chains also engage the sprockets 13 and 14 and the sprockets 21 and 22 on shaft 23 which drives the conveyer chain. The conveyer is shown as consisting of an inclined chute 24 supported at its forward end on the reach 1 and at its upper inclined end by the standards 25 and 26. The floor 27 of the chute terminates short of its ends and lies between the conveying and returning portions 28 and 29 of the conveyer chain 30, the latter being provided with outstanding ribs or projections 31 in the usual manner. The ends of the conveyer chain pass around idle sprockets 32 and 33 and the conveyer chain is maintained in driving contact with sprockets 34 on the shaft 23 by the idlers 35 and 36, there being a set of these on each side of the chute.

It is observed that the sprockets 34 engage the under side of the returning portion of the belt conveyer and that the teeth on the sprockets 34 will be maintained in meshed contact with the belt by the idlers 35 and 36.

Near the forward end of the frame is a transverse shaft 37 which extends entirely across the same and which is provided with sprockets 38 in line with and engaged by the portion 29 of the link belt 30 whereby the shaft 37 will be rotated in a clockwise direction.

On the shaft 37 is a beveled gear 39 meshing with a similar gear 40 on the crank shaft 41 in the brackets 42 and 43 whereby the crank shaft 41 will be rotated. 44 is a pitman connected to the crank of shaft 41 and operating an oscillatory lever 45 pivoted to the bracket 46 on the side of the frame and adapted to operate the reciprocatory cutter bar 47 in the cutting mechanism 48 whereby the stalks which are guided by the flared fingers 49 and 50 and 51 and 52 will be cut, it being apparent by reference to the drawings that the gatherer fingers 49 to 52, both inclusive, will be adjacent to the ground.

On the shaft 37 are sprockets 53 and 54 which drive chains 55 and 56 passing around the sprockets 57 and 58 on the standards 59 and 60 at the front of the machine, the sprockets 57 and 58 being connected to the reel 61 whereby the severed stalks will be gathered into the conveyer and carried to the rear of the machine where they may be deposited into the trailer 62 coupled to the tractor in any convenient manner.

When all of the parts are properly assembled and the engine started, the machine may be driven in a forward direction on account of the connection between the sprockets 13 and 14 and the sprockets 17 and 18 connected to the rear or tractor wheels. The forward rotation of the machine will be effective in operating the conveyer so that the belt will be operated and the belt will communicate motion to the shaft 37 so that the cutter bars and reel will be operated to gather in the stalks cut by the cutter bar.

While I have shown and described a preferred form of my invention, it is to be understood that I do not limit myself to the exact construction shown but reserve the right to make such changes and alterations as may come within the scope of the appended claims.

Having thus described my invention, what I claim as new therein, and desire to secure by Letters-Patent is:

1. In a corn cutter, a frame, a corn cutting mechanism in front of the frame, an inclined conveyer leading from the corn cutting mechanism to the rear of the frame and comprising chains, a corn cutting actuating mechanism driven from the conveyer chains, tractor wheels connected to the frame, an engine, and an endless chain on either side of the frame and actuated by the engine for driving the tractor wheel mechanism and the inclined conveyer mechanism.

2. A corn cutter comprising a frame, tractor wheels mounted on the frame, an inclined conveyer comprising chains, an engine, means for driving the conveyer and tractor wheels from the engine, a shaft near the forward portion of the frame, sprockets on the shaft and in engagement with the conveyer chains whereby movement of the chains will impart movement to the shaft, a reel mounted in the forward part of the machine, means connected to the reel and the shaft for rotating the reel, a corn cutting mechanism, and means driven by the shaft for actuating the corn cutting mechanism.

In testimony whereof I affix my signature.

PETER H. PAMPEL.